United States Patent
Förster

[15] 3,693,075
[45] Sept. 19, 1972

[54] EDDY CURRENT SYSTEM FOR TESTING TUBES FOR DEFECTS, ECCENTRICITY, AND WALL THICKNESS

[72] Inventor: Friedrich M. O. Förster, Grathwohlstrasse 4, Reutlingen, Germany

[22] Filed: Oct. 16, 1970

[21] Appl. No.: 81,320

[30] Foreign Application Priority Data

Nov. 15, 1969 Germany..........P 19 57 489.1

[52] U.S. Cl.....................................324/40, 324/37
[51] Int. Cl. ..............................................G01r 33/12
[58] Field of Search......................324/37, 40, 34 TK

[56] References Cited

UNITED STATES PATENTS

| | | | |
|---|---|---|---|
| 2,065,118 | 12/1936 | Davis, Jr. | 324/40 |
| 2,563,254 | 8/1951 | Lewis | 324/34 TK |
| 3,056,081 | 9/1962 | Hochschild | 324/37 |
| 3,234,457 | 2/1966 | Sower et al. | 324/37 |
| 3,247,453 | 4/1966 | Quitlner | 324/37 |
| 3,466,536 | 9/1969 | Arnelo et al. | 324/37 |

FOREIGN PATENTS OR APPLICATIONS

| | | | |
|---|---|---|---|
| 836,635 | 6/1960 | Great Britain | 324/34 TK |
| 1,071,683 | 6/1967 | Great Britain | 324/37 |
| 1,205,336 | 2/1960 | France | 324/37 |

OTHER PUBLICATIONS

McMaster, R.; Non– Destructive Testing Handbook; Vol. II; The Ronald Press; N.Y. (1963) pp. 39.12–39.19 40.38– 40.42.

*Primary Examiner*—Robert J. Corcoran
*Attorney*—Ervin B. Steinberg

[57] ABSTRACT

Electrically conductive nonferromagnetic or electrically conductive ferromagnetic tubes are tested for wall thickness, eccentricity or defects by the eddy current test method using the transmission coefficient. A coil system comprising an a-c excited primary coil means and an associated secondary (pickup) coil means is coupled sequentially to sections of the tube wall in such a manner that the tube wall section under test is disposed between the primary and the secondary coil means. In one embodiment the primary coil produces a magnetic field whose lines of force are perpendicular to the tube axis, in another embodiment the primary flux is directed axially to the tube. The flux transmitted through the tube wall is modified by the eddy current generated in the tube wall and the secondary coil means is inductively coupled to the flux emerging from the tube wall. Responsive to relative motion between the tube and coil systems an electrical signal appears at the secondary coil means which is evaluated by electrical circuit means for the physical characteristics of the tube. Various coil arrangements are disclosed to derive the stated parameters.

6 Claims, 19 Drawing Figures

FRIEDRICH M. O. FÖRSTER
INVENTOR.

BY:
Erwin B. Steinberg

FRIEDRICH M. O. FÖRSTER
INVENTOR.

FRIEDRICH M. O. FÖRSTER
INVENTOR.

BY:

Ervin B. Steinberg

FRIEDRICH M. O. FÖRSTER
INVENTOR.

BY:

Erwin B. Steinberg

EDDY CURRENT SYSTEM FOR TESTING TUBES FOR DEFECTS, ECCENTRICITY, AND WALL THICKNESS

The present invention concerns the testing of tubes made of electrically conductive or electrically conductive ferromagnetic material simultaneously or selectively for defects, eccentricity, and wall thickness by means of an eddy current system in which the ability of the alternating magnetic fields, weakened by eddy currents, to penetrate through the wall of a tube under test is utilized as a means of ascertaining the stated properties.

Devices are known in which one or more eddy current probes rotate, either in contact with or spaced by a certain distance, about an axially moving cylindrical workpiece. A helical scanning of the workpiece is thus effected.

Probes running in close proximity to the surface of the workpiece comprise coil arrangements, with or without a ferromagnetic core, energized by alternating current. The alternating magnetic fields extending from the rotating coils produce eddy currents in the surface of the workpiece, and such eddy currents, in turn, act upon the rotating coils.

In the event a crack is disposed underneath an eddy current probe, a variation of the eddy current flow is present compared to another portion of the workpiece in which there is no crack. The effect of the eddy current variation caused by a crack on the eddy current probe then serves to indicate the presence of such a defect.

The eddy current system with rotating probes provides good defect detection for such defects as are disposed immediately at the surface or very close to the surface of the workpiece. On the other hand, this system is not suited for the detection of defects on the inside of a tube or of subsurface defects occurring beyond a certain depth beneath the outside surface in thick walled tubes.

Moreover, apparatus are known in which an elongated and thin workpiece is fed through a single or a differential coil arrangement which is more or less adapted to the profile of the workpiece, e.g., solenoid coils. The coil arrangement produces eddy currents in the surface of the workpiece and the effect of the eddy current flow on the coil arrangement permits evaluation of defect presence or absence.

In these arrangements the rapid decrease of the alternating magnetic field at the inside of conductive bodies prevents a satisfactory testing for defects disposed beneath the outside surface.

Furthermore, an arrangement has been disclosed (German OS 1 473 516) for detecting defects which extend through the material thickness of rolled workpieces. A high frequency field is generated along one side of the workpiece normal to its thickness, and the variations of static permeability and variations of eddy current losses are measured at the other side of the workpiece.

With this system, for various reasons, only relatively large defects can be detected, namely, as already stated, those extending all the way through the thickness of the material. However, for the evaluation of a cylindrical product, e.g., a tube, defects present at the inside surface of the wall and not extending all the way through the wall are also of significance.

One of the reasons for the limitation of the arrangement described above results from the amplitude deviations generally recognized as variations of permeability caused by the prior treatment of the workpiece. Smaller defects are masked by the prevailing noise level.

Furthermore, the above-cited reference describes only arrangements in which the coils are disposed coaxially with the workpiece and in which the entire cross section of the material under test is inspected simultaneously. This entails a considerable loss of sensitivity in the event a defect affects only a small portion of the cross section which, to all intents and purposes, always is the case.

It is an object of the present invention to avoid the stated disadvantages and limitations in defect detection, and beyond this to provide for the simultaneous testing of the tube's wall thickness as well as testing for whatever eccentricity may be present in the workpiece.

In order to solve this problem, the present invention utilizes an arrangement in which by means of a primary coil disposed at the inside or outside of a tube to be tested an alternating magnetic field is generated having lines of force normal to the tube wall. The lines penetrate through the tube wall and produce in the wall eddy currents which cause a counter-field which modifies the original magnetic field, thus effecting a weakening of the alternating magnetic field on that side of the tube wall which is located opposite the primary coil. A secondary coil is disposed on the side of the tube wall which is opposite that of the primary coil, and this secondary coil is coupled to a portion of the lines of force of the alternating magnetic field weakened by the eddy currents. Means are provided to move the secondary coil or both coils relative to the tube wall and transverse to the axis of the tube for testing the entire tube circumference or a portion thereof, and such means are adapted also to provide relative motion between the tube and the primary and secondary coils along the tube's longitudinal axis. Electrical signals produced across the output terminals of the secondary coil or coils, which are dependent upon the relative transverse and axial motion, are processed in a known manner and evaluated to provide a measure of the magnitude of a defect in the tube wall, and/or of tube wall eccentricity and/or wall thickness of the tube under test.

The present invention will be more clearly understood by reference to the following description when taken in conjunction with the accompanying drawing in which.

The present invention is based on the theory of the so-called transmission coefficient, see "The Contact-Free Measurement of the Thickness and Conductivity of Metallic Surface Layers, Foils and Sheets, Part 1, Theoretical Basis" Zeitschrift fur Metallkunde, Volume 45 (1954) Number 4; or "Nondestructive Testing Handbook," edited by R.C. McMaster, Vol. II, The Ronald Press Company, New York, N. Y. (1963), Section 39. The term transmission coefficient T is defined as the ratio of the secondary coil voltage $E_M$ with workpiece in place to the "empty coil" voltage $E_o$, absence of workpiece, see McMaster supra page 39.13. Thus $T = E_M/E_o$.

Figure 1:
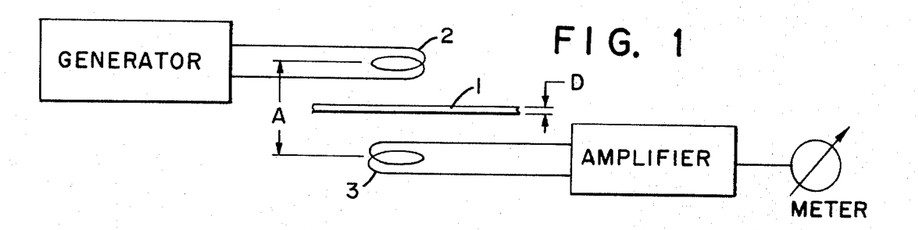
FIG. 1 is a sketch illustrating the principle of the transmission coefficient.

Referring now to FIG. 1, a primary coil 2 energized with alternating current from a generator is disposed on one side of a metal plate 1 and a secondary coil 3 is disposed on the other side. The voltage induced across the terminals of the secondary coil 3 is dependent on the thickness and electrical conductivity of the plate 1. The electric voltage across the secondary coil 3 is dependent also on the distance A of the secondary coil 3 from the primary coil 2, as well as on the frequency f and the field strength of the alternating field of the primary coil, and finally on the number of turns of the secondary coil.

Figure 2:
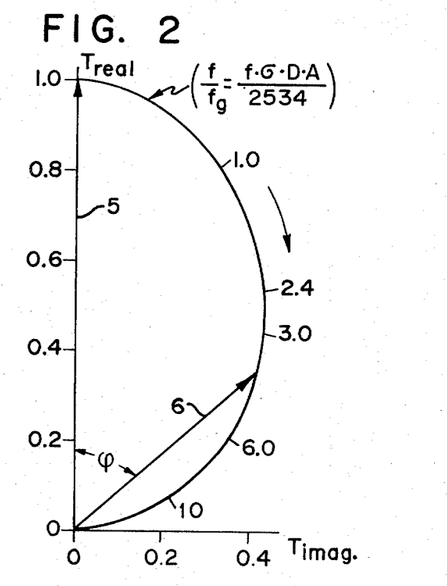
FIGS. 2 and 3 are complex plane diagrams of the transmission coefficient.

This complex relation of the voltage across the secondary coil 3 as a function of the properties of the plate and the primary coil as well as the frequency may be clearly illustrated by means of the standardized diagram shown in FIG. 2. This diagram depicts by amplitude and phase the quotient of the voltage $T = E_M/E_o$ across the secondary coil 3 in FIG. 1 in the presence of the metal plate to the secondary voltage without metal plate.

Vector 5 of the transmission coefficient T in FIG. 2 with normalized length $l$ corresponds to the condition when there is no metal plate interposed between the primary coil and the secondary coil, that is, $T = 1.0$, a real number.

When the thickness or electrical conductivity of a plate 1 disposed between the primary coil 2 and secondary coil 3 increases from zero value, the vector 6 of the transmission coefficient $T$ rotates not only away from the vertical axis by an angle $\phi$ but simultaneously decreases in amplitude. The transmission coefficient vector $T$ then consists of two components, namely the real component $T_{real}$ and the imaginary component $T_{imag}$.

FIG. 2 shows the quantitative relation of the vector $T$ of the transmission coefficient as a function of the properties of the metal plate and the frequency of the primary coil.

The transmission coefficient curve, as obtained by extensive calculations, traces the values of the quotient $f/f_g = f \cdot \sigma \cdot D \cdot A/2534$, where $f$ in Hz stands for the frequency of the alternating field of the primary coil, $\sigma$ in m/Ohm-mm² for the electrical conductivity of the metal plate, $D$ in cm for the thickness of the plate, and $A$ in cm for the average distance of the secondary coil 3 from the primary coil 2. The denominator 2,534 results from the theoretical derivation of the transmission coefficient. The factor $f_g$ denotes the limit frequency and is given by the expression $f_g = 2,534/\sigma \cdot D \cdot \mu_{rel} \cdot A$, wherein $\mu_{rel}$ is the relative permeability, being "1" for aluminum, copper etc. The other factors are as previously defined.

The voltage across the secondary coil 3 of FIG. 1 is produced by that portion of the alternating field established by the primary coil which penetrates through the entire thickness of the plate.

In the same way as a change of plate thickness with a given coil arrangement changes the transmission coefficient as to amplitude and phase, defects in the metal plate result in changes of the transmission coefficient. It will also be readily understood that the change of the transmission coefficient is not affected whether, for example, a certain defect is present on one or the other side of the metal plate, because the information obtained by the secondary coil from the primary coil must penetrate through the entire thickness of the plate. Precisely the same effect is apparent on the transmission coefficient if the material thickness of the plate is reduced on one side or the other.

The principle of measuring the transmission coefficient may be immediately transferred from plates or sheets to tubes, because tubes, corresponding to welded tubes encountered in practice, can be considered as being bent sheets welded together at their edges.

FIG. 2 showed the diagram of the complex secondary voltage normalized for plate thickness zero. It will be apparent that in the region when the imaginary component of the complex transmission coefficient $T$ is at a maximum, a change of wall thickness and of the electrical conductivity of the tube, as well as of the frequency of the primary field, is reflected largely as a change in the vertical direction, i.e., in the direction of the real transmission coefficient.

For example, between the values 2.4 and 3 for the quotient $f/f_g$ in the diagram FIG. 2 the amplitude change of the real transmission coefficient $T_{real}$ is more than 50 times larger than the change of the imaginary transmission coefficient $T_{imag}$.

In the region when the imaginary component of the transmission coefficient is a maximum, changes of the wall thickness and of the electrical conductivity of a metal plate or of a tube are, in the great majority, reflected as a change of the real component $T_{real}$ of the transmission coefficient while the imaginary component $T_{imag}$ of the transmission coefficient remains largely unaffected by geometrical changes (wall thickness and coil distance) and by property changes (electrical conductivity) occurring in a portion of the sheet metal or tube.

Figure 3:
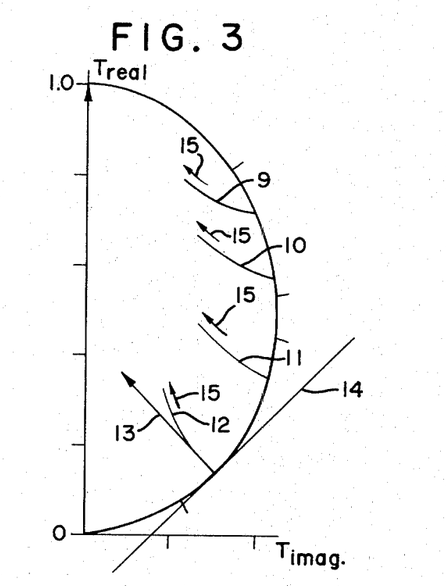

In contrast with the above, when cracks, flaws, and the like, in other words, such defects as should be detected, appear, there is a change of the imaginary component of the transmission coefficient as shown in FIG. 3 corresponding to crack curves 9, 10, 11, and 12, in which the arrows 15 indicate the direction of increasing depth of crack.

In accordance with the present invention, therefore, the eddy current effects produced by cracks and flaws may best be separated from the eddy current effects produced by wall thickness and electrical conductivity changes of a metal plate or a tube, when the frequency of the primary alternating field is selected in such a manner that the quotient $f \cdot \sigma \cdot D \cdot A/2,534$ lies within the range in which the imaginary component of the transmission coefficient in accordance with FIG. 2 is a maximum, and for defect detection only the change of the imaginary component of the transmission coefficient is utilized, using for instance phase-sensitive demodulation.

Defect indication generally may be separated from the indication of the dimension and of the electrical conductivity of the workpiece, when the component 13 in the complex plane of the transmission coefficient is utilized for defect detection. This component stands perpendicular on the tangent 14 which lies against the curve of the transmission coefficient FIG. 3 at the locus of the quotient $f \cdot \sigma \cdot D \cdot A/2,534$.

Figure 4:
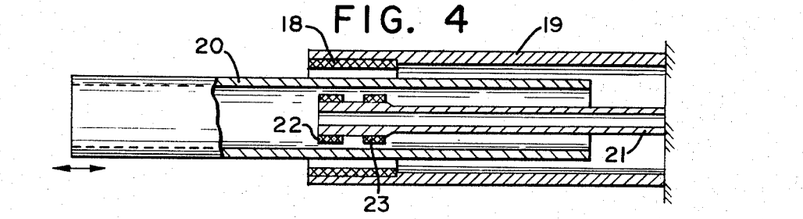
FIG. 4 is an illustration of a coil system for defect testing in which the entire tube cross section is simultaneously inspected.

In the simplest case, a system shown in FIG. 4 can be used for defect testing. An annularly shaped primary coil 18 is held in a stationary support pipe 19. Inside of the primary coil 18 and coaxial therewith are disposed two annularly shaped secondary coils 22 and 23 electrically connected in opposition and carried by a stationary shaft 21. Tube 20 under test is moved in a helical path coaxially through the gap between the primary and secondary coils.

One may proceed from the fact that wall thickness and conductivity over the length of a tube change only slowly, whereas defects such as cracks, flaws, liquations and the like occur suddenly and exhibit rapid changes. Thus, while the voltage changes resulting from wall thickness or conductivity variation are, for all practical purposes, cancelled in the two secondary coils 22 and 23, the voltage changes resulting from defects occurring at different times in the two secondary coils 22 and 23 are readily discerned.

As already mentioned in the introduction, an arrangement in accordance with FIG. 4 has the serious disadvantage in that a cross sectional portion of the tube is simultaneously tested as a whole. A small defect (crack, flaw, etc.) within the tube may have a relatively minor influence on the transmission coefficient when compared to the effect produced by the entire cross section. A significant increase of the sensitivity of defect detection can be obtained if the measurement principle of the transmission coefficient is applied to a relatively small portion or section rather than to the entire cross section of a pipe or sheet-like structure.

Figure 5:
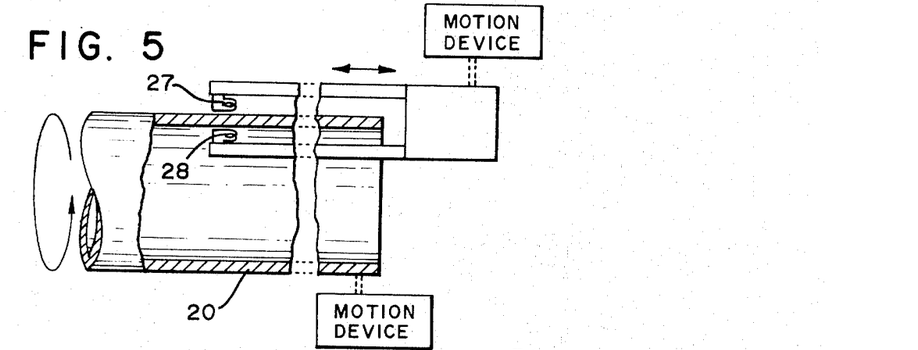
FIG. 5 is an illustration of a testing system in which the wall of a tube is being tested.

This will be achieved in accordance with the present invention by providing a primary coil 27 and a secondary coil 28 in a fork-shaped coil arrangement depicted in FIG. 5. The axis of each coil is perpendicular to the tube. In this way, only the small surface portion disposed between the primary and the secondary coil is used for indicating the transmission coefficient. A small defect in this limited area is rendered appreciably more discernible than using a system which simultaneously inspects the entire cross section of the tube.

In order to test the entire tube for defects the tube may for example be rotated, while the fork-shaped coil arrangement moves into the tube, or the tube rotates spirally into the stationary fork-shaped coil arrangement. Finally, the fork-shaped coil system may rotate with mechanical reversal while the tube moves in an axial direction over the fork. The last-mentioned system is desirable when testing only the ends of tubes.

For weld seam testing it is proposed to oscillate the fork-shaped coil system along the tube surface and normal to the weld seam, so as to move across the weld seam with each oscillation.

For longer tubes yet another arrangement may be utilized for measurement of the transmission coefficient. In this arrangement the tube rotates, while the primary and secondary coils on the outside and inside of the tube are held opposite one another. This may be achieved in accordance with the present invention by pressing the outer and inner coils that face each other against the outside and inside surfaces of the tube by means of a spring system. Here again the system comprising opposite primary and secondary coils mounted upon rods or tubes of corresponding length may be inserted into the rotating tube under test, or the tube under test can be rotated helically over the coil arrangement consisting of a primary and a secondary coil.

Since the value of the wall thickness is included in the transmission coefficient measured by means of the fork-shaped coil arrangement or a corresponding system in which the primary and secondary coils face each other, the absolute value of the wall thickness may be measured by means of the fork-shaped coil system shown in FIG. 5 or a corresponding variation, providing the other parameters such as electrical conductivity, frequency of the primary coil current, and distance between primary and secondary coils are maintained constant.

It is possible, therefore, to distinguish between wall thickness variation and defects in a twofold manner. First, both can be distinguished by their different phase relationship in the diagram of the transmission coefficient in FIG. 3. Secondly, both differ very greatly in their spatial occurrence and, therefore, in their trend relative to time as motion between the tube and the coils takes place. Whereas variations of wall thickness and changes of conductivity practically never occur suddenly, cracks or flaws usually occur abruptly. By the use of suitable time sensitive means coupled to the output voltage of the testing device defects are thus distinguishable from wall thickness effects. Generally both methods may be utilized simultaneously.

Thus, the fork-shaped coil arrangement illustrated in FIG. 5 permits the wall thickness of the tube and defects in the wall of the tube to be indicated separately. In order to accomplish this, in the case of constant wall thickness, the value of the transmission coefficient is indicated as a direct current voltage value after appropriate rectification of the secondary voltage, while defects are sensed as voltage impulses from a high-pass filter as the direct current voltage level changes slowly in response to wall thickness variations.

Figure 6:
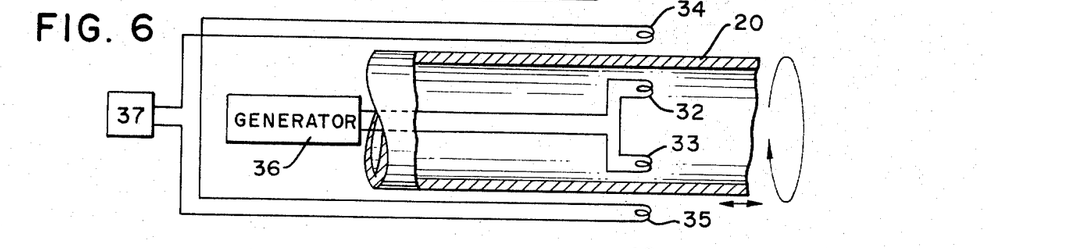
FIG. 6 is an illustration of a testing system in which diametrically opposite sections of a tube wall are compared.

In extending the present invention to the simultaneous measurement of wall thickness and detection of defects in the tube wall, the arrangement illustrated in FIG. 6 is utilized. At two diametrically opposed locations of the tube's circumference a respective primary coil 32 and 33 and a respective secondary coil 34 and 35 face each other. The primary coils 32 and 33 are excited from an alternating current generator 36 and the secondary coils 34 and 35 are connected to a measuring circuit 37. The coils 34 and 35 can be connected in such a way that with constant wall thickness the respective secondary voltages cancel each other. However, as soon as the tube exhibits a certain eccentricity, an alternating voltage signal modulated by the rotational frequency of the tube is apparent.

The term "eccentricity" shall be understood as meaning the wall thickness variation of a tube which arises when the centers of the inner and outer circumference deviate from each other. Mathematically, the eccentricity $\epsilon$ may be defined as a quotient which is formed by the difference of the wall thicknesses of two points diametrically opposite each other in the direction of the maximum and minimum wall thickness relative to the average wall thickness:

$$\epsilon = \frac{D_2 - D_1}{\overline{D}} \quad (1)$$

in which $D_2$ is the maximum wall thickness and $D_1$ the minimum wall thickness of the two opposite locations, and $\overline{D}$ is the average wall thickness. This average wall thickness may be defined from the relationship:

$$\overline{D} = \frac{D_2 + D_1}{2} \quad (2)$$

Generally it is necessary for measuring the eccentricity to provide also a voltage corresponding to the average wall thickness of the tube aside from the difference voltage obtained from the two secondary coils and corresponding to the difference of wall thickness at the two locations to which the secondary coils are coupled.

Figure 7:
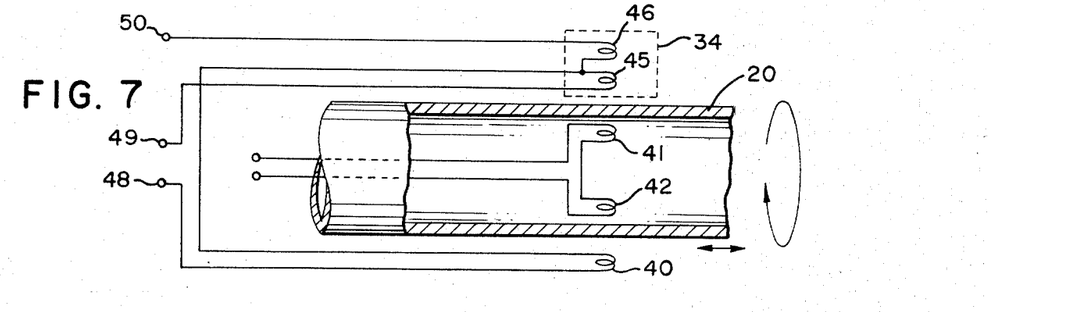
FIG. 7 is an illustration of a testing system with an additional coil for direct measurement of average wall thickness.

This feature is achieved by winding one of the two secondary coils 34 or 35 in bifilar fashion. In FIG. 7 the secondary coil 34 of FIG. 6 comprises two exactly identical windings 45 and 46. The secondary windings 40 and 45 are connected in opposition while the secondary windings 40 and 46 are connected in series. In other words, the voltage at the terminals 48–49 in FIG. 7 is formed by the change of wall thickness of the tube at the two locations of the secondary coils, whereas the voltage across the terminals 48–50 corresponds to the sum of the two secondary voltages.

It follows from the theory of the transmission coefficient that with large values of the quotient $f \cdot \sigma \cdot D \cdot A /$ 2,534, e.g., with values of this product exceeding a value of 10, the relationship is:

$$e_1 = K/D_1 \text{ and } e_2 = K/D_2 \quad (3)$$

In the foregoing $e_1$ represents the amplitude of the secondary voltage at the location at the tube with wall thickness $D_1$, and $e_2$ represents the amplitude of the secondary voltage at the location at the tube with wall thickness $D_2$.

In the coil system of FIG. 7 the difference $e_1 - e_2$ occurs at terminals 48–49, while at terminals 48–50 the sum $e_1 + e_2$ is present. In accordance with equation (3) the terminal voltage 48–49 in FIG. 7 is computed as follows:

$$e_1 - e_2 = K \left( \frac{D_2 - D_1}{D_2 \cdot D_1} \right) \quad (4)$$

For the voltage across the terminals 48–50 the following applies:

$$e_1 + e_2 = K \left( \frac{D_2 + D_1}{D_2 \cdot D_1} \right) \quad (5)$$

If terminal voltage 48–50 in FIG. 7 is halved by a voltage divider, this halved value corresponds to:

$$\frac{e_1 + e_2}{2} = \frac{K}{D_2 \cdot D_1} \cdot \frac{D_2 + D_1}{2} \quad (6)$$

The expression $(D_2 + D_1)/2$ is however identical with the average value $\overline{D}$ of the tube's wall thickness.

By means of an electronic divider and using the values $e_1 - e_2$ and $(e_1 + e_2)/2$ the eccentricity $\epsilon$ of a tube in accordance with equation (1) can be determined.

Therefore, in the system illustrated in FIG. 7 the eccentricity of the tube will be obtained directly when by known electronic circuits the quotient is formed between the terminal voltage 48–49 and the halved terminal voltage 48–50.

In the systems described heretofore the tube rotates, while the primary and secondary coils remain stationary. In such an arrangement the speed of testing the tube is limited because the tube's rotational speed is restricted by mechanical factors, such as bends in the tube.

Figure 8:
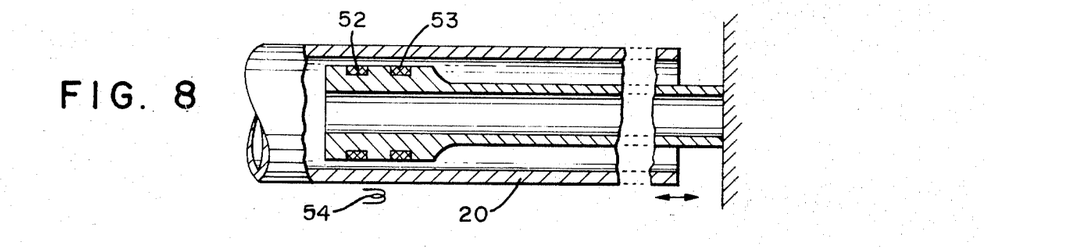
FIG. 8 is an illustration of a testing system with stationary primary coil.

The inside primary coils illustrated in FIGS. 6 and 7 are disposed exactly opposite the respective secondary coils. However, the primary coils disposed inside the tube may be replaced by an arrangement comprising two stationary annular coils 52 and 53, illustrated in FIG. 8, whose field directions are in opposition. As a result, the axial component of the field is cancelled and the radial field component is reinforced. Thus, as illustrated in FIG. 8, for a certain tube circumference there emerges through the tube wall an electromagnetic alternating field whose lines of force are predominantly perpendicular to the tube surface. At the tube circumference location where the lines of force extend normal to the tube surface, a secondary coil 54 whose axis is perpendicular to that of the tube 20 is disposed and rotated about the tube. This mechanically rotating secondary coil measures the transmission coefficient of the tube circumference at the location of the tube surface where the electromagnetic lines of force emerge normal from this surface. Under the condition of constant electrical conductivity, an electric voltage is provided by the rotating secondary coil and such voltage is dependent upon the wall thickness of the tube.

For carrying out the test process, it is important that the two primary coils 52 and 53 are sufficiently spaced from one another. In this way the field intensity normal to the tube wall is made substantially constant for a certain region.

This system is thus suitable on one hand for measuring the wall thickness along a tube circumference, on the other hand the arrangement disclosed may be utilized for defect testing and eccentricity measurement of the tube by means of a respective arrangement of one rotating secondary coil or of several rotating secondary coils.

If the rotating secondary coil 54 in FIG. 8 is formed as an absolute coil, the absolute value of the wall thickness of the respective tube circumference is measured. In a manner similar to that illustrated in FIGS. 6 and 7, two or more always diametrically oppositely disposed secondary coils may be utilized in order to obtain the average value and the maximum value of the difference of wall thickness for determining tube eccentricity, as already described above. Since the difference voltage of two diametrically arranged secondary coils rotating about the tube after rectification is applied to a high-pass filter which passes only the sudden changes of the secondary voltage, this arrangement, in accordance with the present invention, may be utilized for defect testing because these rapid, sudden changes of the secondary voltage are generated only by defects present in the tube wall.

A variation of the system shown in FIG. 8, which can be advantageous for defect testing, utilizes a secondary coil 54 with a coil axis normal to the field which emerges in a perpendicular direction out of the tube wall. No voltage is induced across such a secondary coil when defect-free tube portions are traversed. When a defective portion of the tube passes, on account of the eddy current reaction, there results a field component which is in the direction of the coil axis of coil 54.

Once more the previously mentioned special characteristic of the transmission coefficient should be pointed out, namely that inside and outside defects present in the tube are detected in precisely the same manner and with precisely the same sensitivity.

Figure 9:
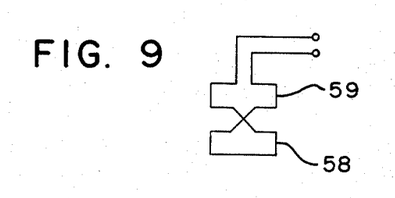
FIG. 9 is an illustration of a differential coil for defect measurement.

In a further extension of the present invention a differential coil made of two halves rotating about the tube is utilized as a secondary coil, rather than an absolute coil. As an example of such a differential coil, FIG. 9 shows an arrangement in which the half 58 exhibits a winding direction opposite to that of half 59. For the sake of simplicity the differential coil 58, 59 of FIG. 9 is drawn with only one winding.

Figure 10:
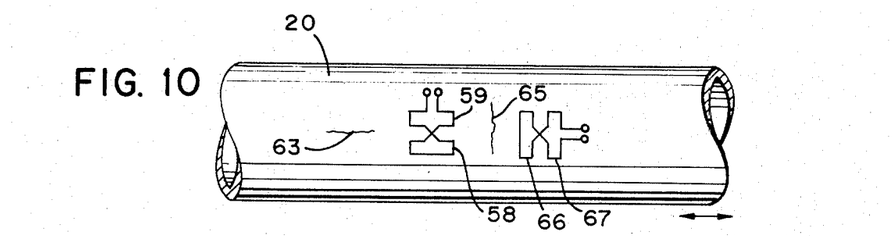
FIG. 10 is an illustration of a test arrangement using a differential coil.

In FIG. 10 the reaction of the secondary differential coils to longitudinal and transverse defects is illustrated. For a longitudinal defect 63 system 58, 59 is best; for a transverse defect 65 a coil system 66, 67 is best.

In order to detect most suitably all defects irrespective of their orientation, combinations of two or more rotating secondary differential coil arrangements are provided, so that at least one arrangement optimum for longitudinal defects and one arrangement optimum for transverse defects scan the wall of the tube.

In the above-described systems illustrated by FIGS. 8, 9, and 10, in which the electromagnetic alternating field is for the most part perpendicular to the surface of the tube, the rotating secondary coils receive the normal component of the alternating field.

When performing certain tests, such as searching for longitudinal defects, it is desirable, however, to process the tangential component of the magnetic field produced by the primary coil system.

Figure 11:
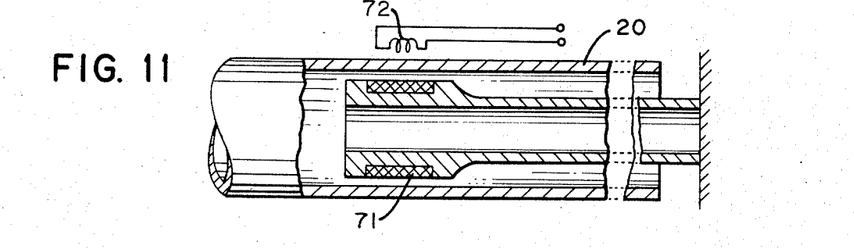
FIG. 11 is an illustration of a testing system having a single tangentially disposed surface coil.

For this purpose in accordance with the invention and shown in FIG. 11, a primary coil is disposed inside the tube and shaped in the form of a simple annular coil 71. This coil according to the purpose of the test may be more or less elongated.

Figure 12:
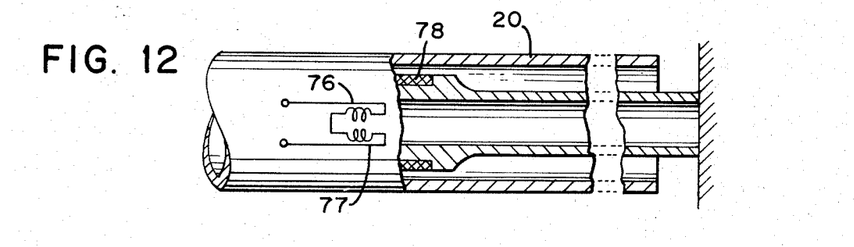
FIG. 12 is an illustration of a testing system using a tangential coil in differential arrangement.

In FIG. 11 the secondary coil 72 is responsive to the tangential, in the direction of the tube axis effective, field which is produced by the primary coil 71 and penetrates through the tube wall. In this embodiment, instead of the normal component of the primary field, as represented by FIG. 8, the tangential component is utilized for wall thickness measurement and defect detection. Respective coil arrangements, as previously described, may be utilized to provide thickness and eccentricity measurement, and defect detection. For example, FIG. 12 shows a secondary differential coil system 76, 77 for measuring the tangential axial field intensity component in order to accomplish testing for defects. Numeral 78 identifies the primary coil disposed inside the tube.

For defect testing it is possible also, in place of the secondary coil system 76–77, to employ a simple secondary coil whose coil axis is perpendicular to the lines of force of the primary field. No voltage will be generated across the coil as long as the tube under test remains defect-free. However, a defect in the tube wall disposed opposite the secondary coil results in a voltage across the secondary coil terminals. This signal, utilized for defect indication, is the result of a component along the direction of the coil axis of the field produced by the eddy current.

Figure 13:
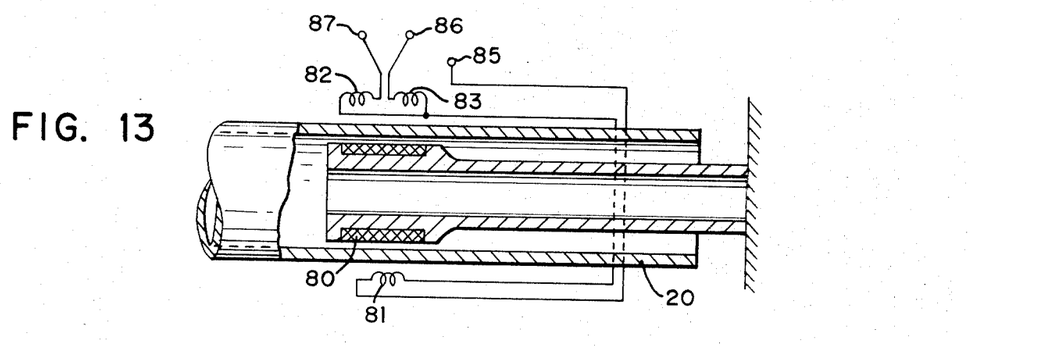
FIG. 13 is an illustration of a testing system having tangential coils in differential arrangement and an additional coil for direct measurement of average wall thickness.

To provide wall thickness and eccentricity measurement, FIG. 13 shows a secondary coil system for the tangential axial field intensity component. In FIG. 13, numeral 80 is the primary coil inside of tube 20. Numerals 81, 82 and 83 are the secondary coils, placed diametrically opposite and rotating about the tube, for measuring the tangential longitudinal component of the primary field penetrating through the wall. Terminals 85–86 in FIG. 13 provide a voltage which corresponds to the sum of the two secondary voltages across the coils 81 and 83.

On the other hand, terminals 85, 87 provide the difference of the two secondary voltages of coils 81 and 82. The sum and difference signals are utilized in the previously described manner for the determination of average wall thickness and of tube eccentricity.

In the description of the coil arrangements provided above it was assumed that non-ferromagnetic tubes are being tested, and thus that the relative permeability of the tube material would have the value $\mu = 1$.

When defect testing and wall thickness measurement is to be performed on ferromagnetic tubes the effect of the relative permeability on the measurement of the transmission coefficient is overcome by exposing the tube under test at the test site to a magnetic direct current field which saturates the tube magnetically and reduces the magnetic permeability to the value $\mu = 1$ or close to 1.

In order to apply the system using the transmission coefficient measurement for determining wall thickness, eccentricity and defects to ferromagnetic tubes, the primary-secondary coil arrangement is disposed in a magnetic saturation field. To this end, two arrangements are usable in accordance with the teachings of the present invention:

(1) An external magnetic yoke through which the tube moves. The primary and secondary coils are disposed in the area of the field intensity provided by the yoke, see for instance U.S. Pat. No. 2,353,211 issued to T. Zuschlag dated July 11, 1944.

(2) An internal magnetic yoke for the magnetic saturation of the tube at the location of the primary-secondary coil system.

An internally disposed magnetic yoke is particularly simple to construct in view of the fact that an internal coil or coil system mounted to a tube or support of corresponding length is utilized in the above-described system in order to determine the wall thickness, eccentricity and defect.

Figure 14:
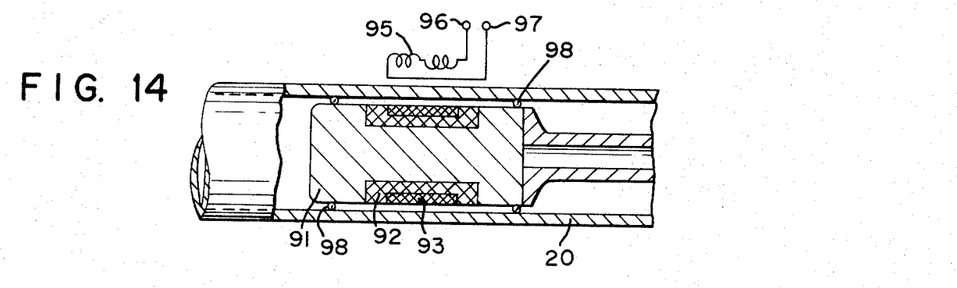
FIG. 14 is an illustration of a testing system with a yoke coil inside the tube to be tested.

FIG. 14 shows, in an exemplary manner applicable to many systems, a coil system corresponding to FIG. 12, but having a magnetic yoke to produce magnetic saturation in the tube 20. Numeral 91 identifies the magnetic core which supports a direct current winding 92. The winding 93 generates the primary alternating magnetic field, which by means of the differential coil probe 95 is received outside the tube. Responsive to the passage of a defect a difference voltage is apparent at the terminals 96 and 97.

To avoid adherence of the magnetic yoke 91 to the inner wall of the tube 20, the heavier ends of the yoke include hard metal spacer elements 98 or rollers which prevent direct contact between the ferrous portions of the yoke and the inside of the tube and thereby prevent adherence of the tube.

Similarly, the primary coil means 27 in FIG. 5 and the primary coil means 52 and 53 in FIG. 8 can be disposed within a direct current magnetic field which serves to saturate the tube portion under test when a ferromagnetic tube is being tested.

The following description concerns typical electrical circuits for the coil arrangements disclosed heretofore. These circuits have been described broadly in the previous text.

Figure 15:
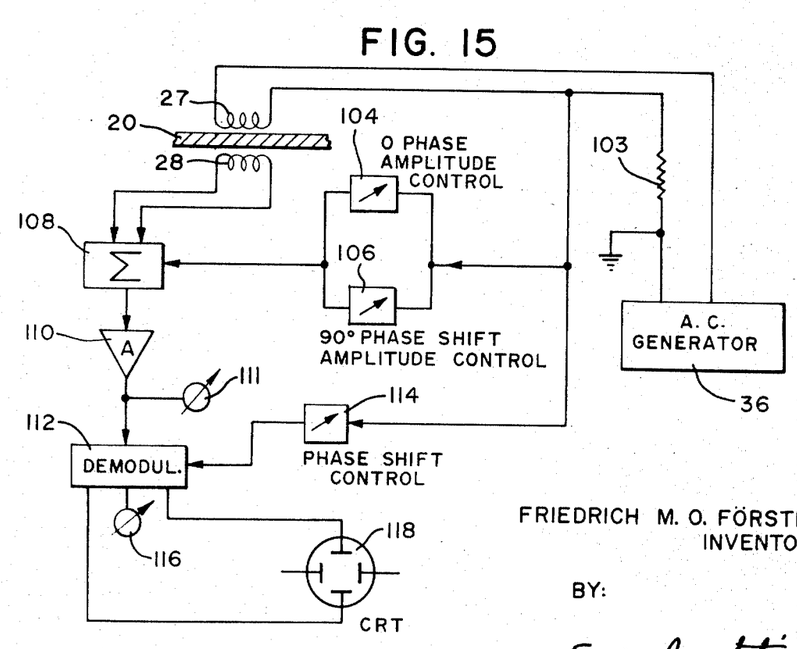
FIG. 15 is a schematic electrical circuit diagram of a typical measuring circuit.

The circuit diagram per FIG. 15 will be described in conjunction with the fork-shaped coil arrangement per FIG. 5 although it shall be understood that the same electrical circuit is usable also in conjunction with several of the other coil systems illustrated.

Figure 16:
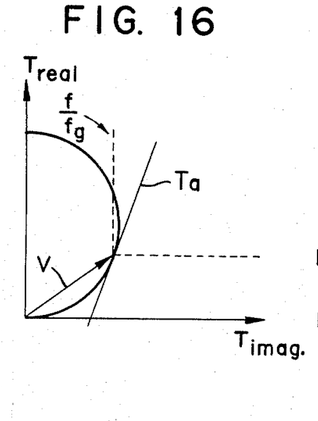
FIG. 16 is a schematic diagram for explaining the circuit per FIG. 15.

The alternating current generator 36 via resistor 103 applies an exciting current to the primary coil 27. The secondary coil 28 disposed at the other side of the wall of the tube 20 receives a voltage signal which is responsive to the magnetic field penetrating through the tube wall and the relative motion, all as explained heretofore. This secondary voltage, corresponding to the vector V, FIG. 16, is applied as an input voltage to a summing network 108. Another voltage signal derived across the resistor 103 is applied to an amplitude and phase shift control means 104 and 106. The control means 104 and the control means 106 are so designed that the respective outputs provide a signal of adjustable amplitude at 0° phase angle and at 90° phase angle, respectively. By combining both output signals, as indicated, a vector signal of adjustable amplitude and phase is derived. The output from the control means 104 and 106 is applied also to the summing means 108. By suitably adjusting the output from the control means 104 and 106 the summing means 108 is controlled in such a manner that it provides zero output as indicated at the meter 111 which is connected to the output side of the amplifier 110. This condition corresponds to the voltage compensation of the vector V, FIG. 16, and a new rectangular coordinate system is obtained as is indicated by the dashed coordinates, FIG. 16.

When it is desired to suppress the variations caused by the wall thickness, the phase shift control 114 is adjusted for a signal normal to the direction of the tangent $Ta$. Voltage changes caused by variations of the wall thickness reflect themselves as voltage signals along the curve, that is, in the vicinity of the point of operation along the tangent and thus are substantially suppressed. In contrast therewith, voltage changes caused by cracks in the tube wall cause significant components having a direction normal to the tangent $Ta$ and, therefore, are indicated after passing through the phase-sensitive demodulator at the meter 116, or on the cathode ray tube 118. Conversely, it is possible to emphasize changes of the tube wall thickness by a corresponding adjustment of the phase shift control 114.

Figure 17:
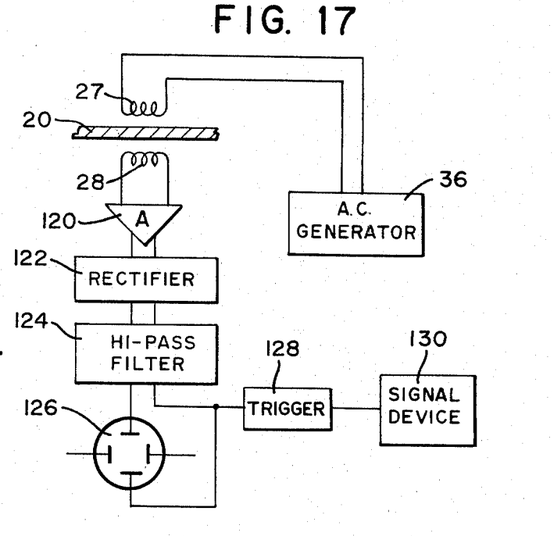
FIG. 17 is a schematic electrical circuit diagram of another measurement arrangement.

As indicated previously, the variations of wall thickness can be separated from defects by virtue of the time responsive occurrence of the respective signals. This is shown in greater detail in FIG. 17. The alternating current generator 36 excites the primary coil 27. The alternating current signal obtained by the secondary coil 28 is amplified by the amplifier 120, is rectified by rectifier 122 and then is applied to a high-pass filter 124. The filter passes abruptly occurring voltage variations which are caused by defects, but blocks the passage of voltage variations which occur at a slow rate, such as are normally caused by variations of the wall thickness of the tube 20. The output from the filter 124 is connected to a trigger stage 128 and to a signalling device 130. The horizontal deflection plates of the cathode ray tube 126 can be energized with a deflection voltage which is synchronized with the rotation of the coils about the tube 20 or the rotation of the tube relative to the coils. In this event the cathode ray tube shows a defect signal whose horizontal position on the screen is related to the defect location at the tube circumference.

Figure 18:
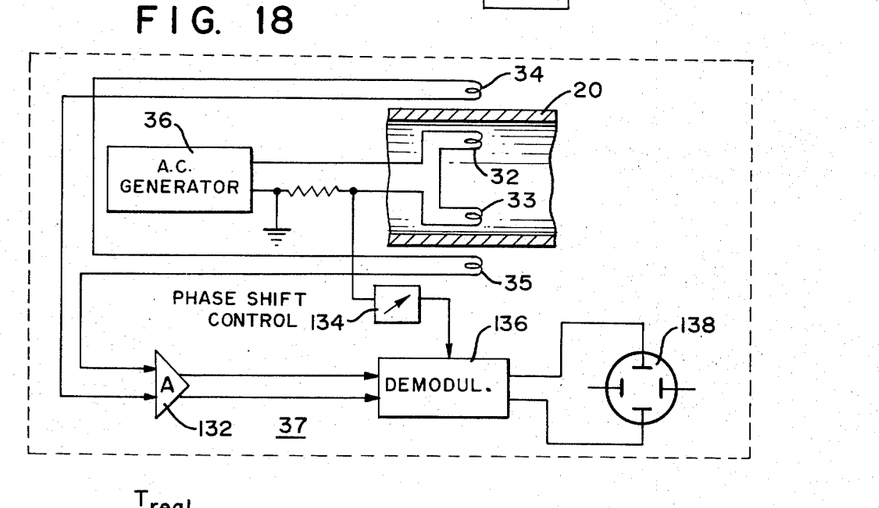
FIG. 18 is another schematic electrical circuit diagram.
Figure 19:
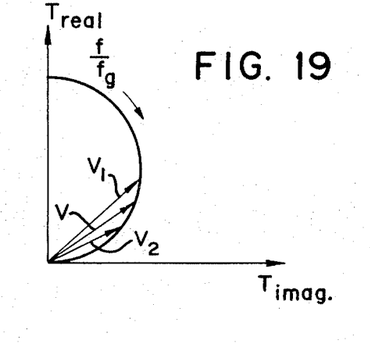
FIG. 19 is a schematic diagram for explaining the circuit per FIG. 18.

The typical circuit represented by block 37 of FIG. 6 is shown in detail in FIG. 18. The alternating current generator 36 excites both primary coils 32 and 33. The secondary coils 34 and 35 are connected to each other in such a manner that the induced voltage signals cancel if the wall thickness is constant. If the respective wall thickness portions between the primary and secondary coil pairs become unequal, the voltage signals no longer cancel. The voltage signal applied to the input of the amplifier 132 increases in response to increasing differences of the wall thickness portions disposed respectively between coils 32 and 34, and coils 33 and 35. If vector V, FIG. 19, is considered to represent the average wall thickness and if vectors $V_1$ and $V_2$ are considered to represent the limits of the wall thickness difference, then a line through the amplitude values of $V_1$ and $V_2$ corresponds to a vector representing the limits of wall thickness difference. From this, the optimum phase angle for the reference voltage applied via the phase shifter 134 to the phase-sensitive demodulator 136 is derived. This voltage once again corresponds substantially to the tangent on the transmission curve at the particular working point selected. In practice, the phase angle is quite readily adjusted by disposing specimens with suitable wall thickness differences between the respective primary and secondary coils. It is only necessary then to adjust the phase shift control means 134 until maximum indication on the cathode ray tube 138 is noted.

The above-described systems represent a new non-destructive testing system which measures in a quantitative manner the tube wall thicknesses and tube eccentricity, and detects, moreover, defects in the wall of tubes, whereby the indication of a given individual defect is independent whether the defect is located on the outside or inside wall of the tube.

What is claimed is:

1. An apparatus for testing a tube made of electrically conductive nonferromagnetic or electrically conductive ferromagnetic material separately or simultaneously for defects, eccentricity and wall thickness with eddy currents comprising:

primary coil means comprising a first and a second coil adapted to be disposed at diametrically opposed sections of the tube to be tested at one side of the tube wall to cause, when energized with alternating current, a pair of alternating magnetic fields, each field penetrating the respective tube wall section with lines of force which are substantially perpendicular to the tube wall whereby to cause in said sections eddy currents which modify the respective original alternating magnetic fields and cause counter-fields disposed at the other side of the respective tube wall sections opposite the locations of said first and second coils;

means for energizing said first and second coils with alternating current to produce said alternating magnetic fields;

secondary coil means adapted to be located at said other side of said tube wall sections opposite said first and second coils and for being coupled to respective portions of the lines of force of said respective alternating fields modified by said eddy currents; said secondary coil means comprising a third coil and a fourth coil, said fourth coil having two bifilarly wound windings, and said third coil being coupled in series with one winding of said bifilarly wound coil and coupled in opposition with the other winding of said bifilarly wound coil;

means for causing relative motion between said tube and said primary and secondary coil means in a direction parallel to the tube axis and circumferentially about the tube surface, whereby to produce at the terminals of said secondary coil means an electrical output signal which is responsive to said motion, and means adapted to be coupled to said secondary coil means for receiving said electrical output signal and evaluating it for at least one of the properties comprising the presence of defects in the tube wall, eccentricity, and wall thickness of the tube portion under test.

2. An apparatus as set forth in claim 1, said primary and said secondary coil means being disposed stationary, and said means for causing relative motion imparting motion to the tube.

3. An apparatus as set forth in claim 1, said means adapted to be coupled for receiving said output signal comprising an electrical quotient forming circuit connected to said in series coupled and said in opposition coupled windings for providing a signal responsive to the quotient of the signals across said respective winding connections.

4. An apparatus for testing a tube made of electrically conductive nonferromagnetic or electrically conductive ferromagnetic material separately or simultaneously for defects, eccentricity and wall thickness with eddy currents comprising:

primary coil means comprising a first and a second coil adapted to be disposed at diametrically opposed sections of the tube to be tested at one side of the tube wall to cause, when energized with alternating current, a pair of alternating magnetic fields, each field penetrating the respective tube wall section with lines of force which are substantially perpendicular to the tube wall whereby to cause in said sections eddy currents which modify the respective original alternating magnetic fields and cause counter-fields disposed at the other side of the respective tube wall sections opposite the locations of said first and second coils;

means for energizing said first and second coils with alternating current to produce said alternating magnetic fields;

secondary coil means adapted to be located at said other side of said tube wall sections opposite said first and second coils and for being coupled to respective portions of the lines of force of said respective alternating fields modified by said eddy currents; said secondary coil means comprising a third coil and a fourth coil, said fourth coil having two windings, and said third coil being coupled in series with one of said windings of said fourth coil and coupled in opposition with the other winding of said fourth coil;

means for causing relative motion between said tube and said primary and secondary coil means in a direction parallel to the tube axis and circumferentially about the tube surface, whereby to produce at the terminals of said secondary coil means an electrical output signal which is responsive to said motion, and means adapted to be coupled to said secondary coil means for receiving said electrical output signal and evaluating it for at least one of the properties comprising the presence of defects in the tube wall, eccentricity, and wall thickness of the tube portion under test.

5. An apparatus as set forth in claim 4, said primary and said secondary coil means being disposed stationary, and said means for causing relative motion imparting motion to the tube.

6. An apparatus as set forth in claim 4, said means adapted to be coupled for receiving said output signal comprising an electrical quotient forming circuit connected to said in series coupled and said in opposition coupled windings for providing a signal responsive to the quotient of the signals across said respective winding connections.

* * * * *